(12) United States Patent
Studer et al.

(10) Patent No.: US 12,096,758 B1
(45) Date of Patent: Sep. 24, 2024

(54) INSECT TRAP INSTALLATION AND LEVELING BRACKET AND METHOD

(71) Applicant: GARDNER MANUFACTURING CO., INC., Horicon, WI (US)

(72) Inventors: Bruce R. Studer, Germantown, WI (US); Timothy M. Jones, Phoenix, AZ (US)

(73) Assignee: Gardner Manufacturing Co., Inc., Horicon, WI (US)

( * ) Notice: Subject to any disclaimer, the term of this patent is extended or adjusted under 35 U.S.C. 154(b) by 34 days.

(21) Appl. No.: 18/124,439

(22) Filed: Mar. 21, 2023

(51) Int. Cl.
*A01M 1/04* (2006.01)
*A01M 1/00* (2006.01)

(52) U.S. Cl.
CPC ......... *A01M 1/00* (2013.01); *A01M 2200/012* (2013.01)

(58) Field of Classification Search
CPC .................. A01M 1/00; A01M 2200/012
See application file for complete search history.

(56) References Cited

U.S. PATENT DOCUMENTS

| | | | |
|---|---|---|---|
| 4,876,822 A | 10/1989 | White | |
| 5,454,542 A * | 10/1995 | Hart | A47G 1/1606 248/494 |
| 6,719,260 B1 * | 4/2004 | Hart | A47G 1/1606 248/479 |
| 7,313,880 B2 * | 1/2008 | Yamagishi | A47G 1/10 40/782 |
| 8,572,890 B1 * | 11/2013 | Lark | A01M 1/145 43/113 |
| 8,898,945 B2 * | 12/2014 | Miller | A47G 1/162 40/713 |
| 9,775,450 B2 | 10/2017 | Will et al. | |
| 10,098,483 B2 | 10/2018 | Krake et al. | |
| 10,945,540 B2 * | 3/2021 | Krake | A47G 1/16 |
| 11,547,223 B1 * | 1/2023 | Hassett | G01C 9/34 |
| 2005/0178942 A1 * | 8/2005 | Dodig | A47G 1/20 248/475.1 |
| 2006/0101661 A1 * | 5/2006 | Schmidt | G01C 9/26 33/613 |
| 2006/0226318 A1 * | 10/2006 | D'Amico | B25B 11/002 248/274.1 |
| 2015/0354230 A1 * | 12/2015 | Houser | G01C 9/34 33/379 |

* cited by examiner

*Primary Examiner* — Amy J. Sterling
(74) *Attorney, Agent, or Firm* — Bradley J. Thorson; DeWitt LLP

(57) ABSTRACT

Flying insect traps are more easily and securely mounted to a wall in a level fashion using a bracket adapted to be easily leveled as it is attached to a stud within a wall.

5 Claims, 4 Drawing Sheets

INSECT TRAP INSTALLATION AND LEVELING BRACKET AND METHOD

CROSS-REFERENCED TO RELATED APPLICATIONS

Not applicable.

STATEMENT REGARDING FEDERALLY SPONSORED RESEARCH OR DEVELOPMENT

Not applicable.

BACKGROUND OF THE INVENTION

I. Field of the Invention

The present invention relates to wall mounted insect traps. More specifically, the present invention relates to an installation and leveling bracket, and methods related thereto, used to mount an insect trap quickly and securely to the wall so that the insect trap is level.

II. Related Art

Wall-mounted insect traps have been used for many years in restaurants, other food preparation facilities, and other building where the control of flying insects is deemed appropriate. An example of such a trap is shown in U.S. Pat. No. 4,876,822 granted Oct. 31, 1989, to James N. White and entitled "Flying Insect Control Unit Using Lights and Adhesives". As shown in this patent, which is hereby incorporated in its entirety by reference, such traps typically include a housing containing an ultraviolet light source as an insect attractant and a glue board to which insect adhere when they come in contact with the glue board. The housing includes one or more openings to permit egress of ultraviolet light from the trap and the ingress of insects into the trap. The walls of the trap are typically adapted to direct the ultraviolet light away from the eyes of, for example, restaurant patrons in the room where the trap is located and shield from the patron's view the insects adhered to the glue board.

As is also shown in the White patent, the back wall of the housing has a pair of keyhole openings. To mount the trap to a wall, a pair of headed fasteners, e.g., nails or screws, are attached to the wall and then slid through the keyhole fasteners. This mounting technique is generally effective but is deficient in several respects.

First, this requires two headed fasteners to be arranged horizontally. If the fasteners are not level with each other, the trap will sit at a slanted rather than a level when mounted. Second, many walls are made of sheetrock and the studs supporting the sheetrock are not always uniformly spaced the same distance apart as the keyholes of the trap. This can lead to an insecure mount if the heading fasteners so not each reside in underlying studs. Third, is someone bumps the trap after it is mounted, the heads of the headed fasteners can exit the keyholes and the trap can fall.

SUMMARY OF THE INVENTION

The present invention solves each of the foregoing problems by providing novel mounting brackets. More specifically, brackets made in accordance with the present invention comprise a top wall engaging member extending along a first plane and having a first mounting orifice adapted to receive a first headed fastener. Such brackets further include a bottom wall engaging member also extending along the first plane and having a second mounting orifice and adapted to receive a second headed fastener. The first mounting orifice and the second mounting orifice extending along and define a first line.

The bracket also includes an engagement plate. The engagement plate extending between the top wall engagement member and bottom wall engagement member along a second plane parallel to and offset from the first plane. The engagement plate has a main body portion and a pair of coupling members projecting upwardly from the main body portion. First and second notches open to the top of the main body portion of the engagement plate are also provided in certain embodiments of the invention.

The bracket is also provided with a bubble level extending along a second line perpendicular the first line. The bubble level is adapted to indicate when the first line extends vertically so that the first mounting orifice and the second mounting orifice are vertically aligned.

The methods of the present invention employ brackets made in accordance with the foregoing, two headed fasteners such as nails or screws, and an insect trap having a bracket receptor associated with the back wall. This bracket receptor may be a pair of slots or a single channel in the back wall adapted to receive the coupling members of the bracket. The bracket receptor may also be pair of hooks adapted to engage and reside in the notches of the bracket, or a pair of hooks (alternatively a single, elongate hook) adapted to engage the coupling members of the bracket. "Bracket receptor" is a broad term covering these mechanisms and any comparable mechanism associated with the back wall of a trap and adapted to engage the coupling members or notches of the bracket so that the bracket can support the trap.

When the methods of the present invention are employed, an installer, having the trap, bracket and headed fasteners in hand, locates a vertically extending stud in a wall. The installer then places the bracket so that the top engagement member and the bottom engagement member are against the wall and at least one of the first mounting orifice and the second mounting orifice is aligned with the stud. The installer then inserts the first headed fastener through said one of the first mounting orifice and the second mounting orifice and drives the headed fastener into the stud. Using the bubble level, the installer next vertically aligns the first mounting orifice and the second mounting orifice. With the first and second mounting orifices so aligned, the installer inserts second headed fastener through the other of the first mounting orifice and the second mounting orifice and drives the second headed fastener into the stud. Installation of the trap is completed by coupling the pair of coupling members or notches of the bracket to the bracket receptor of the trap. This is typically achieved by positioning the traps bracket receptor above the pair of coupling members or notches of the bracket and then sliding the trap down until the pair of coupling members or notches of the bracket are fully engaged with the bracket receptor of the trap.

BRIEF DESCRIPTION OF THE DRAWINGS

The foregoing features, objects and advantages of the invention will become apparent to those skilled in the art from the following detailed description and with reference to the following drawings in which like numerals in the several views refer to corresponding parts.

DETAILED DESCRIPTION

Figure 1:
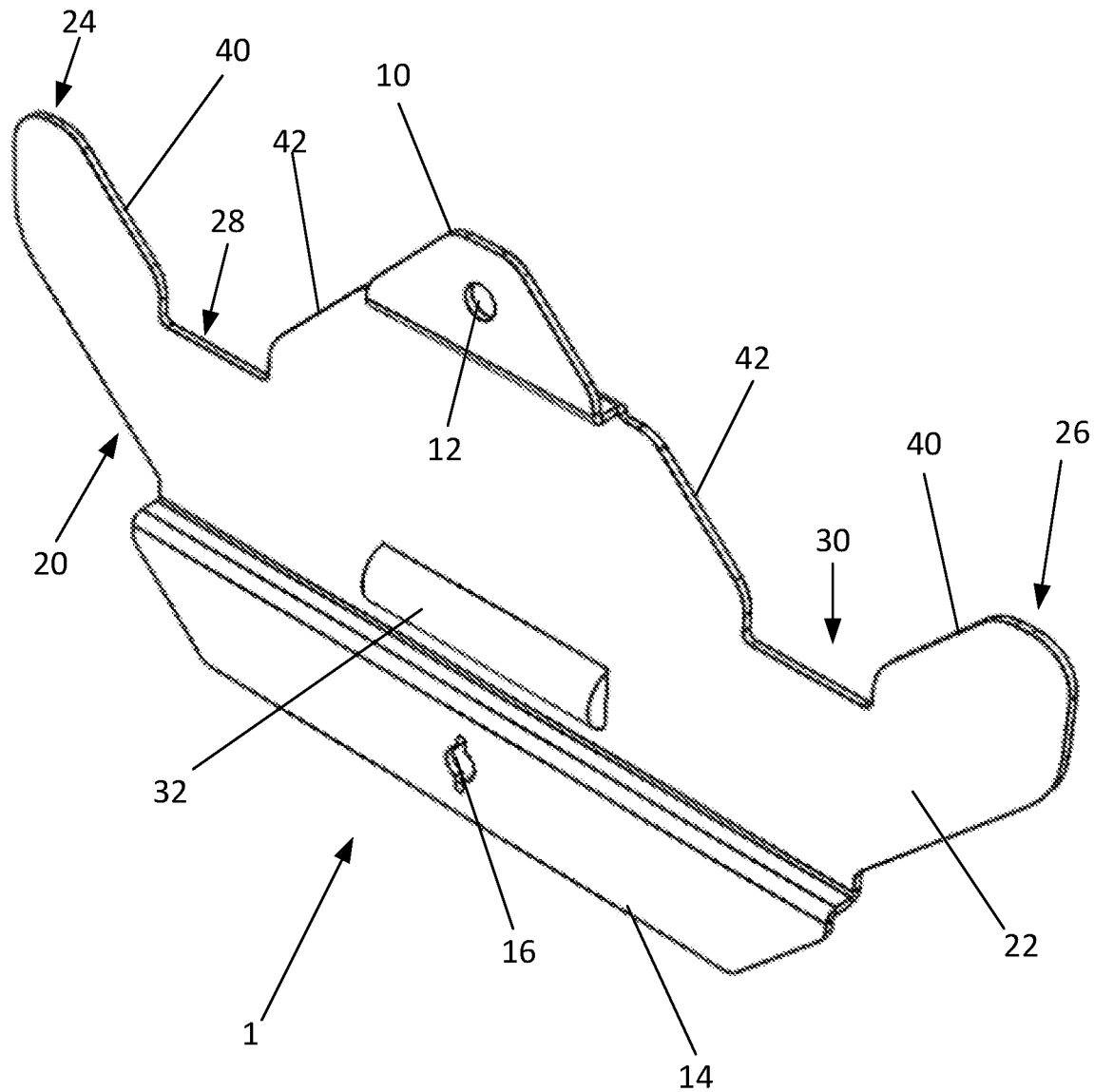
FIG. 1 is a perspective view of a bracket made in accordance with the present invention.

This description of the preferred embodiment is intended to be read in connection with the accompanying drawings, which are to be considered part of the entire written description of this invention. In the description, relative terms such as "lower", "upper", "horizontal", "vertical", "above", "below", "up", "down", "top" and "bottom", "under", as well as derivatives thereof (e.g., "horizontally", "downwardly", "upwardly", "underside", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "joined", and "joining" are used interchangeably and refer to one structure or surface being secured to another structure or surface or integrally fabricated in one piece unless expressly described otherwise.

A novel mounting bracket 1, made in accordance with the present invention is shown in the drawings. The bracket 1 includes a top wall engaging member 10 extending along a first plane and having a first mounting orifice 12 adapted to receive a first headed fastener 100. Such brackets further include a bottom wall engaging member 14 also extending along the first plane and having a second mounting orifice 16 and adapted to receive a second headed fastener 102. The first mounting orifice and the second mounting orifice extending along and define a first line.

The bracket 1 also includes an engagement plate 20. The engagement plate 20 extending between the top wall engagement member 10 and bottom wall engagement member 14 along a second plane parallel to and offset from the first plane. The engagement plate 20 has a main body portion 22 and a pair of coupling members 24 and 26 projecting upwardly from the main body portion. The engagement plate 20 also has a pair of notches 28 and 30 open to the top of the main body portion 22 of the engagement plate 20. Extending above and outwardly from each notch are a pair of guide surfaces 40/42.

The bracket 1 includes a bubble level 32 extending along a second line perpendicular the first line. The bubble level 32 is adapted to indicate when the first line extends vertically so that the first mounting orifice 12 and the second mounting orifice 16 are vertically aligned.

Figure 3:
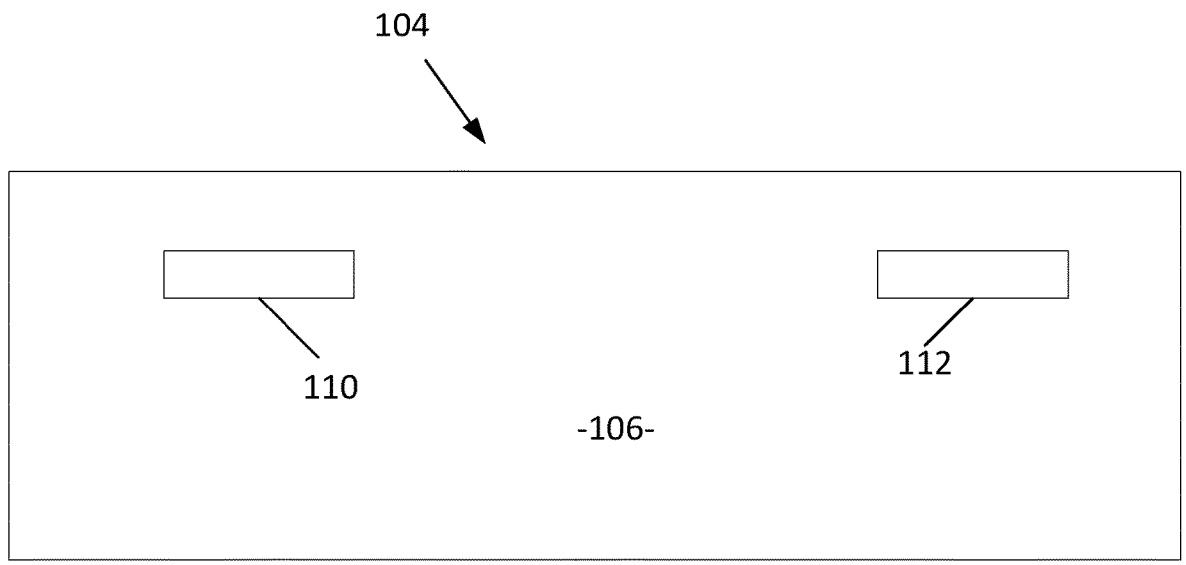
FIGS. 3, 4 and 5 are schematic diagrams illustrating different styles of bracket receptors of an insect trap that can be used with the bracket of FIG. 1 to mount the trap on a wall.
Figure 4:
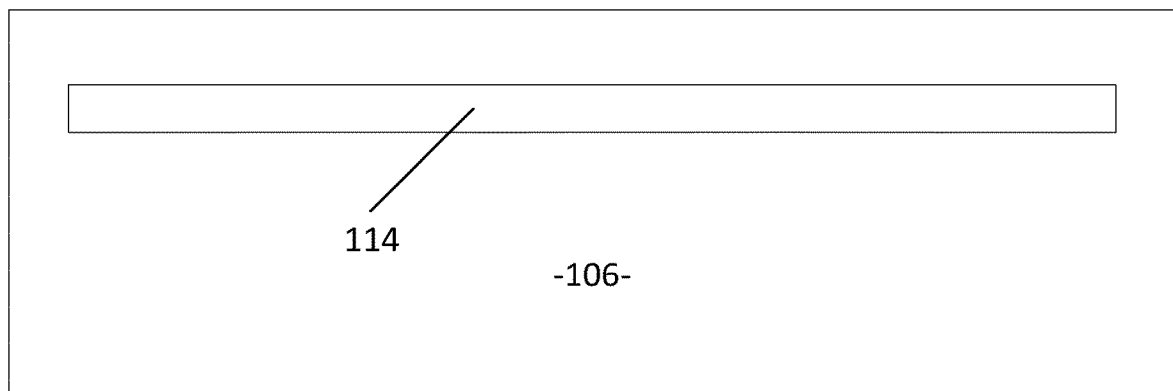
Figure 5:
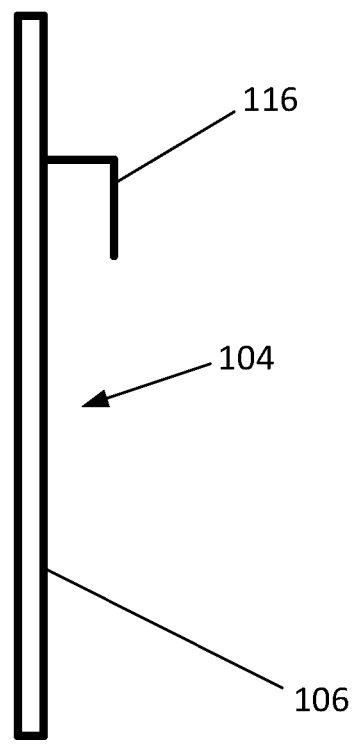

The methods of the present invention may be employed using the bracket 1, two headed fasteners 100 and 102 such as nails or screws, and an insect trap 104 having a bracket receptor associated with the back wall 106 of the trap. This bracket receptor may be a pair of slots 110 and 112 (see FIG. 3) or a single channel 114 (See FIG. 4) in the back wall 106 of the housing of the insect trap 104 and adapted to receive the coupling members 24 and 26 of the bracket 1. The bracket receptor may also be pair of hooks 116 adapted to be received in the notches 28 and 30 open to the top of the main body portion 22 of the engagement plate 20, or a single, elongate hook adapted to engage the coupling members 24 and 26 of the bracket 1. See FIG. 5. When the trap has a pair of hooks, guide surfaces 40/42 help guide the hooks into the notches 28 and 30. "Bracket receptor" is a broad term covering these mechanisms and any comparable mechanism associated with the back wall of a trap and adapted to engage the coupling members of the bracket so that the bracket can support the trap.

Figure 2:
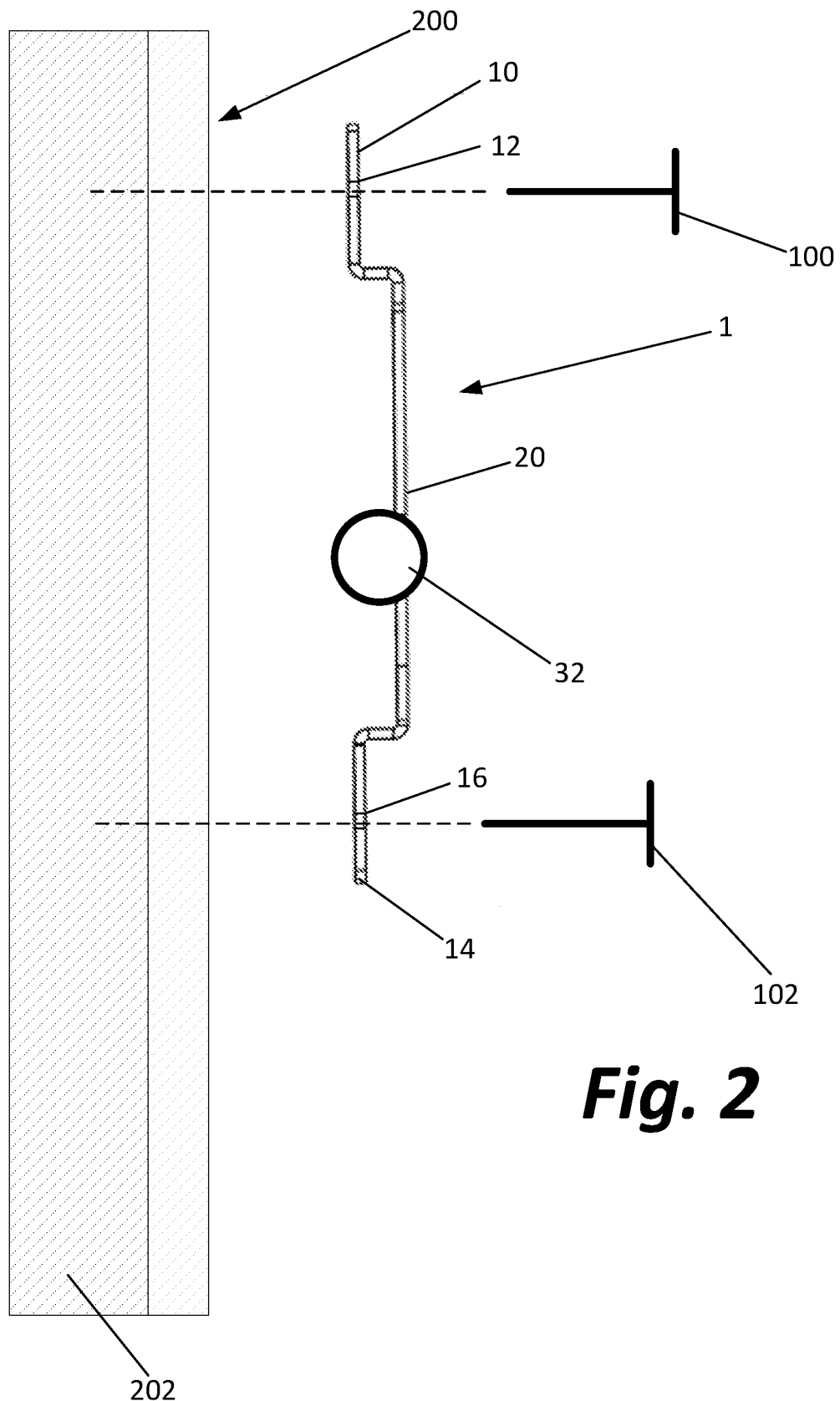
FIG. 2 is a schematic diagram illustrating how the bracket of FIG. 1 may be attached to a vertical stud within a wall using headed fasteners.

When the methods of the present invention are employed, an installer, having the trap 104, bracket 1 and headed fasteners 100 and 102 in hand, locates a vertically extending stud 202 in a wall 200. See FIG. 2. The installer then places the bracket 1 so that the top wall engaging or engagement member 10 and the bottom wall engaging or engagement member 14 are against the wall 200 and at least one of the first mounting orifice 12 and the second mounting orifice 16 is aligned with the stud 202. The installer then inserts the first headed fastener (i.e., either headed fastener 100 or 102) through a one of the first mounting orifice 12 and the second mounting orifice 16 and drives the headed fastener into the stud 202. Using the bubble level 32, the installer next vertically aligns the first mounting orifice 12 and the second mounting orifice 16. With the first and second mounting orifices 12/16 so aligned, the installer inserts second headed fastener (i.e., the other of fasteners 100/102) through the other of the first mounting orifice 12 and the second mounting orifice 16 and drives the second headed fastener into the stud 202.

Installation of the trap is completed by coupling the pair of coupling members 24 and 26 (or notches 28 and 30) of the bracket 1 to the bracket receptor of the trap. This is typically achieved by positioning the trap's bracket receptor above the pair of coupling members (or notches) of the bracket and then sliding the trap down until the pair of coupling members (or notches) of the bracket are fully engaged with the bracket receptor of the trap.

Within the scope of the following claims, the invention may be practiced otherwise than as specifically shown in the drawings and described above. The foregoing description is intended to explain the various features and advantages but is not intended to be limiting. The scope of the invention is defined by the following claims which are also intended to cover a reasonable range of equivalents.

What is claimed is:

1. A bracket for installing a wall-mounted insect trap having a bracket receptor, said bracket comprising:
   a. a top wall engaging member extending along a first plane and having a first mounting orifice adapted to receive a second headed fastener;
   b. a bottom wall engaging member also extending along the first plane and having a second mounting orifice and adapted to receive a second headed fastener, said first mounting orifice and said second mounting orifice extending along a first line;
   c. an engagement plate extending along a second plane parallel to and offset from the first plane, said engagement plate having a main body portion and a pair of coupling members projecting upwardly from the main body portion; and
   d. a bubble level extending along a second line perpendicular the first line and adapted to indicate when the first line extends vertically so that the first mounting orifice and the second mounting orifice are vertically aligned.

2. The bracket of claim 1 further comprising first and second notches open to the top of the main body portion of the engagement plate.

3. The bracket of claim 2 further comprising guide surfaces extending upwardly and outwardly from each of the first and second notches.

4. A method for installing a flying insect trap having a bracket receptor, said method including:
   a. providing first and second headed fasteners, and a bracket comprising (i) a top wall engaging member extending along a first plane and having a first mounting orifice adapted to receive a second headed fastener, (ii) a bottom wall engaging member also extending along the first plane and having a second mounting orifice and adapted to receive a second headed fastener, said first mounting orifice and said second mounting orifice extending along a first line, (iii) an engagement plate extending along a second plane parallel to and offset from the first plane, said engagement plate having a main body portion and a pair of coupling members projecting upwardly from the main body portion, and (iv) a bubble level extending along a second line perpendicular the first line and adapted to indicate when the first line extends vertically so that the first mounting orifice and the second mounting orifice are vertically aligned;
   b. locating a vertically extending stud in a wall;
   c. placing the bracket so that the top engagement member and the bottom engagement member are against the wall and at least a selected one of the first mounting orifice and the second mounting orifice is aligned with the stud;
   d. inserting the first headed fastener through a one of the first mounting orifice and the second mounting orifice, and into the stud;
   e. using the bubble level to vertically align the first mounting orifice and the second mounting orifice;
   f. inserting the second headed fastener through the other of the first mounting orifice and the second mounting orifice, and into the stud; and
   g. attaching the flying insect trap to the bracket by causing the bracket receptor of the trap to become coupled to the pair of coupling members of the bracket.

5. A method for installing a flying insect trap having a bracket receptor, said method including:
   a. providing first and second headed fasteners, and a bracket comprising (i) a top wall engaging member extending along a first plane and having a first mounting orifice adapted to receive a second headed fastener, (ii) a bottom wall engaging member also extending along the first plane and having a second mounting orifice and adapted to receive a second headed fastener, said first mounting orifice and said second mounting orifice extending along a first line, (iii) an engagement plate extending along a second plane parallel to and offset from the first plane, said engagement plate having a main body portion, a pair of coupling members projecting upwardly from the main body portion, and first and second notches open to the top of the main body portion of the engagement plate, and (iv) a bubble level extending along a second line perpendicular the first line and adapted to indicate when the first line extends vertically so that the first mounting orifice and the second mounting orifice are vertically aligned;
   b. locating a vertically extending stud in a wall;
   c. placing the bracket so that the top engagement member and the bottom engagement member are against the wall and at least a selected one of the first mounting orifice and the second mounting orifice is aligned with the stud;
   d. inserting the first headed fastener through a one of the first mounting orifice and the second mounting orifice, and into the stud;
   e. using the bubble level to vertically align the first mounting orifice and the second mounting orifice;
   g. inserting the second headed fastener through the other of the first mounting orifice and the second mounting orifice, and into the stud; and
   g. attaching the flying insect trap to the bracket by causing the bracket receptor of the trap to become coupled to at least one of (i) the pair of coupling members of the bracket, and (ii) the first and second notches open to the top of the main body portion of the engagement plate.

* * * * *